L. V. SWISHER.
Corn Planter.

No. 201,717. Patented March 26, 1878.

Witnesses:
Wm Bagger
W. W. Heaton

Inventor:
Linneus V. Swisher.
By Parker H. Sweet, Jr. & Co.
Attys.

UNITED STATES PATENT OFFICE.

LINNEUS V. SWISHER, OF MAPLE'S MILL, ILLINOIS.

IMPROVEMENT IN CORN-PLANTERS.

Specification forming part of Letters Patent No. 201,717, dated March 26, 1878; application filed September 20, 1877.

*To all whom it may concern:*

Be it known that I, LINNEUS V. SWISHER, of Maple's Mill, in the county of Fulton and State of Illinois, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
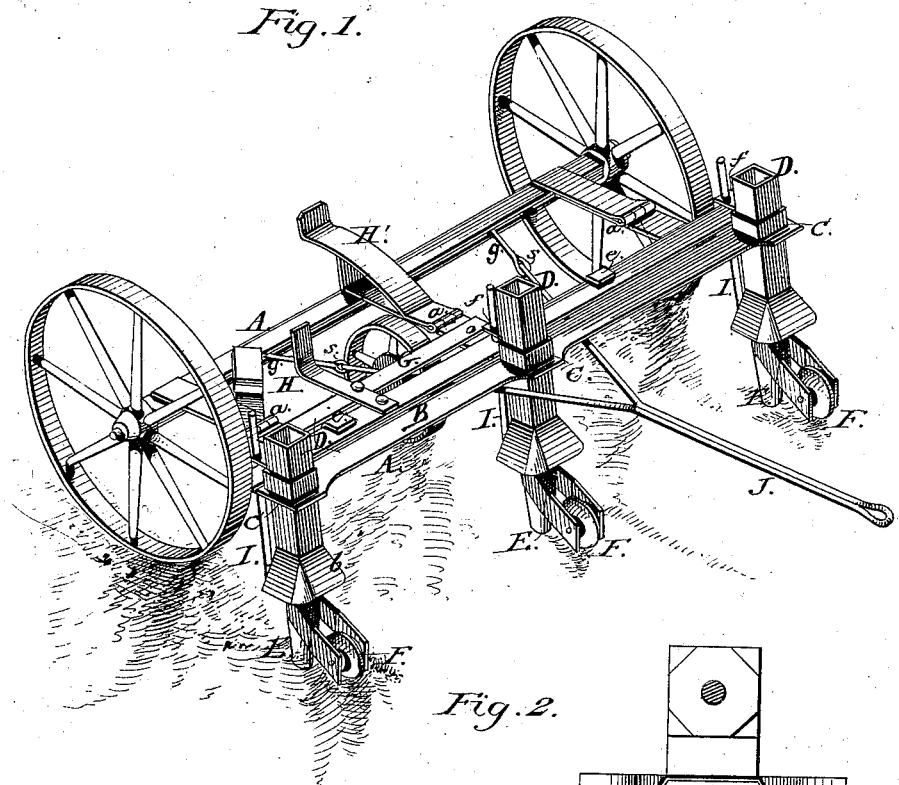
Figure 2:
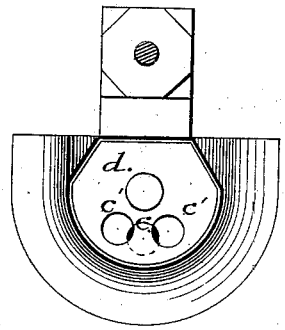
Figure 3:
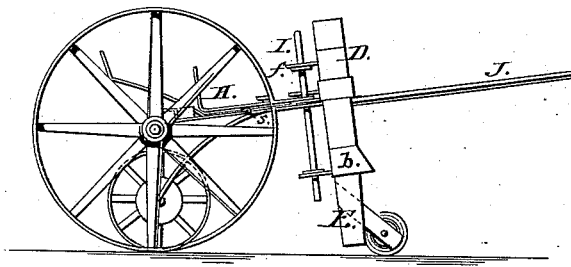

Figure 1 represents a perspective view of my invention. Fig. 3 represents a side view, and Fig. 2 a detail view, of the same.

Similar letters of reference occurring on the several figures indicate like parts.

My invention relates to an improved construction of corn-planters in which provision is made for planting three rows of corn at one and the same time, and also for dispensing with the shovels or colters commonly used; and it consists in the details of construction and general arrangement of parts, all as will be hereinafter more fully described, and pointed out in the claims.

Referring to the drawings, A represents the carriage-frame, having the beam B carrying the seed-dropping mechanism pivoted thereto, as shown at $a$, said beam being provided at each end and at the center with square openings C, for the introduction of the upright rectangular seed-hoppers D. These seed-hoppers are each composed of an elongated rectangular tube, having an enlarged portion, $b$, at or near its center, and tapering from thence to the bottom of the same, forming a spout, E, where it is provided with a steel wheel, F, having tapering sides, terminating in a sharp edge or rim, for cutting a furrow in the ground in which to drop the corn or seed at regular intervals. The bottom of the enlarged portion $b$ of the hopper is provided with an opening, $c$, directly over the tapering spout E, and a semicircular slide, $d$, having an opening, $c'$, is pivoted to the center of the bottom plate, as shown in Fig. 2. These seed-slides $d$ are operated through the medium of a sliding bar, G, which works in guides $e$ projecting from the beam B, and is provided with a hand-lever, H, operated from the seat H', as shown in Fig. 1.

A rod, I, passing through the sliding bar G, is arranged in the rear of each hopper, and is attached at the lower end to the seed-slide $d$, and at the top to a lug, $f$, projecting from the upper part of the hopper.

By means of this construction the seed-slides are readily operated by the hand-lever H, and at the same time provision is made for the up- and-down movement of the seed-hoppers carrying the cutting-wheels F through the openings C in the beam B, to adapt said wheels to the uneven surface of the ground during the operation of planting.

A tongue, J, is attached to the beam B, and is pivoted, as shown at $s$, to braces $g$ on the carriage-frame A, while a seat, H', is provided at the rear of the carriage-frame, as shown.

The construction of my invention being as hereinbefore described, it will be observed that as the apparatus is propelled over the ground the wheels F at the base of the hoppers D cut furrows or grooves in the soil, and the driver of the apparatus, operating the lever H with his foot, causes the seed-slides $d$ to discharge the seed at regular intervals in the furrows, which are covered up by the broad-rimmed wheels at the rear of each of the seed-hoppers D, pressing the soil over and down upon the same.

It will also be observed that the wheels F are adapted to move up or down, to conform to the rise and fall in the surface of the ground.

The advantages of my invention will be readily apparent, inasmuch as I am enabled to produce a simple, durable, and effective corn-planter possessing a high degree of economy and lightness in its construction, combined with a ready adaptation to the purpose intended.

Having thus described my invention, what I claim as new and useful is—

1. In a corn-planter, the rectangular upright hoppers D, each provided with lug $f$ and rod I, and having an enlarged portion, $b$, provided with seed-opening $c$, slide $d$, having openings $c'$ $c'$, and spout E, provided with wheel F, in combination with the sliding bar G, moving in guides $e$ on beam B, and lever H, substantially as and for the purpose specified.

2. The combination of the upright sliding hoppers D, constructed as described, with the beam B, pivoted to the frame A, substantially as and for the purpose specified.

3. The vertically-sliding hoppers D, each having an enlarged part, $b$, provided with seed-opening $c$, slide $d$, having openings $c'\ c'$, and spout E, provided with wheel F, the several parts being adapted for operation substantially as and for the purpose specified.

In testimony that I claim the foregoing as my own invention I affix my signature in presence of two witnesses.

LINNEUS V. SWISHER.

Witnesses:
OSCAR HAYNES,
RICHARD HALL.